United States Patent
Zenoni et al.

(10) Patent No.: US 6,269,844 B1
(45) Date of Patent: Aug. 7, 2001

(54) DEVICE AND METHOD FOR MOVING AND CONTROLLING WEFT WINDING ARM IN WEFT FEEDERS

(75) Inventors: Pietro Zenoni; Giovanni Pedrini, both of Leffe; Luca Gotti, Albino, all of (IT)

(73) Assignee: L.G.L. Electronics S.p.A., Gandino (IT)

( * ) Notice: Subject to any disclaimer, the term of this patent is extended or adjusted under 35 U.S.C. 154(b) by 0 days.

(21) Appl. No.: 09/668,457

(22) Filed: Sep. 25, 2000

(30) Foreign Application Priority Data

Oct. 26, 1999 (IT) .............................................. TO99A0928

(51) Int. Cl.$^7$ .................................................. D03D 47/36
(52) U.S. Cl. .............................................................. 139/452
(58) Field of Search ............................................... 139/452

(56) References Cited

U.S. PATENT DOCUMENTS

| | | | |
|---|---|---|---|
| 4,716,943 | * | 1/1988 | Yoshida et al. ....................... 139/452 |
| 5,016,680 | * | 5/1991 | Mitsuya et al. ....................... 139/452 |
| 5,857,496 | * | 1/1999 | Brown et al. ......................... 139/110 |

\* cited by examiner

*Primary Examiner*—Andy Falik
(74) *Attorney, Agent, or Firm*—Guido Modiano; Albert Josif; Daniel O'Byrne

(57) ABSTRACT

A device for moving and controlling a weft winding arm in weft feeders for weaving looms, comprising a switched-reluctance motor which is controlled by a first closed loop for speed control, having its own reference variable and its own measured variable, and by a second closed loop for controlling the current that circulates in the phase of the motor, also having its own reference variable and its own measured variable; the reference variable of the first loop corresponds to the rotation rate that the winding arm must assume in order to correctly restore the turns of the weft reserve, and the reference variable of the second loop is constituted by a current value computed by the first control loop.

12 Claims, 5 Drawing Sheets

DEVICE AND METHOD FOR MOVING AND CONTROLLING WEFT WINDING ARM IN WEFT FEEDERS

BACKGROUND OF THE INVENTION

The present invention relates to a device and a method for controlling the weft winding arm in weft feeders for weaving looms.

Conventional weft feeders are devices which comprise a fixed drum on which a weft winding arm, which rotates around the drum, winds in a fishing-reel fashion a plurality of turns of yarn which constitute a weft reserve. The turns unwind from the drum of the feeder, when requested by the loom, at each weft insertion, and the weft winding arm, under the control of a supervisor microprocessor, rewinds the turns in order to restore the weft reserve.

Currently, the motor most widely used for the movement of the weft winding arm is of the asynchronous three-phase type. This choice is essentially dictated by the inherent characteristics of these motors and mainly by their low manufacturing and maintenance costs, which are allowed by their simple and sturdy structure and by the complete lack of elements in mutual sliding contact.

Moreover, the evolution of semiconductor technology has provided supervisor microprocessors which integrate peripheral units capable of directly generating the waveforms of the control signals for the inverter that drives such motors, where the term "inverter" is used to designate the driving device capable of generating a system of multiphase sinusoidal voltages with freely variable amplitude and frequency.

However, although the asynchronous motors are satisfactory in performance/cost terms, they suffer considerable drawbacks which limit the performance, especially in application to the movement of the weft winding arm of weft feeders.

The main drawback is the impossibility to achieve simple and effective control of the torque delivered by the motor. To do this, it is in fact necessary to resort to sophisticated control systems of the vector type which however, due to their complexity and to their high computing power requirements, are not adapted to be installed at low cost in weft feeders. Accordingly, it is necessary to renounce to these expensive and complicated control systems and to assume an open-loop system for the adjustment of the speed of the motor, i.e. the synchronization speed set by the inverter is chased by the motor.

In this manner, however, it is impossible to obtain high dynamic performance from the motor, and this is a severe drawback if the weft winding arm of the weft feeder is required to perform high accelerations and decelerations, as occurs increasingly often as a consequence of the continuous increase in the weaving speed.

Moreover, with the open-loop adjustment system the current absorbed by the motor is often significantly higher than the current that is actually necessary; accordingly, the power absorbed in excess is dissipated as heat, is and this causes harmful overheating of the motor and of the electronic components of the power section of the inverter.

SUMMARY OF THE INVENTION

The aim of the present invention is essentially to eliminate these severe drawbacks, and within the scope of this general aim the invention has the following particular objects:

to provide a device and a method for the movement and control of the rotation of the weft winding arm of weft feeders which are simple and reliable in their concept and structure, in particular free from errors and uncertainties in operation and capable of rapidly adapting the operating criteria of the weft winding arm to the requirements of the loom and more generally to the rapid variations of the parameters of the weaving process;

to provide a control and movement device and method as specified which are adapted to allow in particular, an efficient adjustment of the torque that actuates the weft winding arm, so as to allow rapid accelerations and decelerations of the arm;

to provide a device and a method for moving and controlling the weft winding arm of a weft feeder by using, as signals which are significant for driving the entire control system, the signals produced by at least part of the sensors that are already present in the weft feeder.

In order to achieve this aim, these and other objects which will become better apparent hereinafter from the following detailed description, the present invention relates to a method and a device for controlling the rotation of the weft winding arm of a weft feeder, having the specific characteristics stated in the appended claims.

Substantially, according to the invention, a movement and control device is provided in which the weft winding arm is moved by a switched-reluctance electric motor, whose speed is controlled by a first closed-loop adjustment system. The first system comprises a logic block which, by processing the pulsed signals of a first sensor or group of sensors for detecting the speed of the arm and of a second sensor or group of sensors for detecting the passage of the turns of weft that unwind from the feeder, obtains a datum which represents the reference variable of the feedback loop, the reference variable corresponding to the rotation rate that the winding arm must assume in order to correctly restore the weft turns. A second system, also of the closed-loop type, is provided in order to control the torque delivered by the reluctance motor and is substantially adapted to adjust the value of the current circulating in the phase that is active and switched at the instant being considered, the torque being proportional to the square of the phase current.

BRIEF DESCRIPTION OF THE DRAWINGS

The characteristics, purposes and advantages of the device and of the movement and control method according to the present invention will become better apparent from the following detailed description and with reference to the accompanying drawings, given by way of non-limitative example and wherein.

DESCRIPTION OF THE PREFERRED EMBODIMENTS

Figure 1:
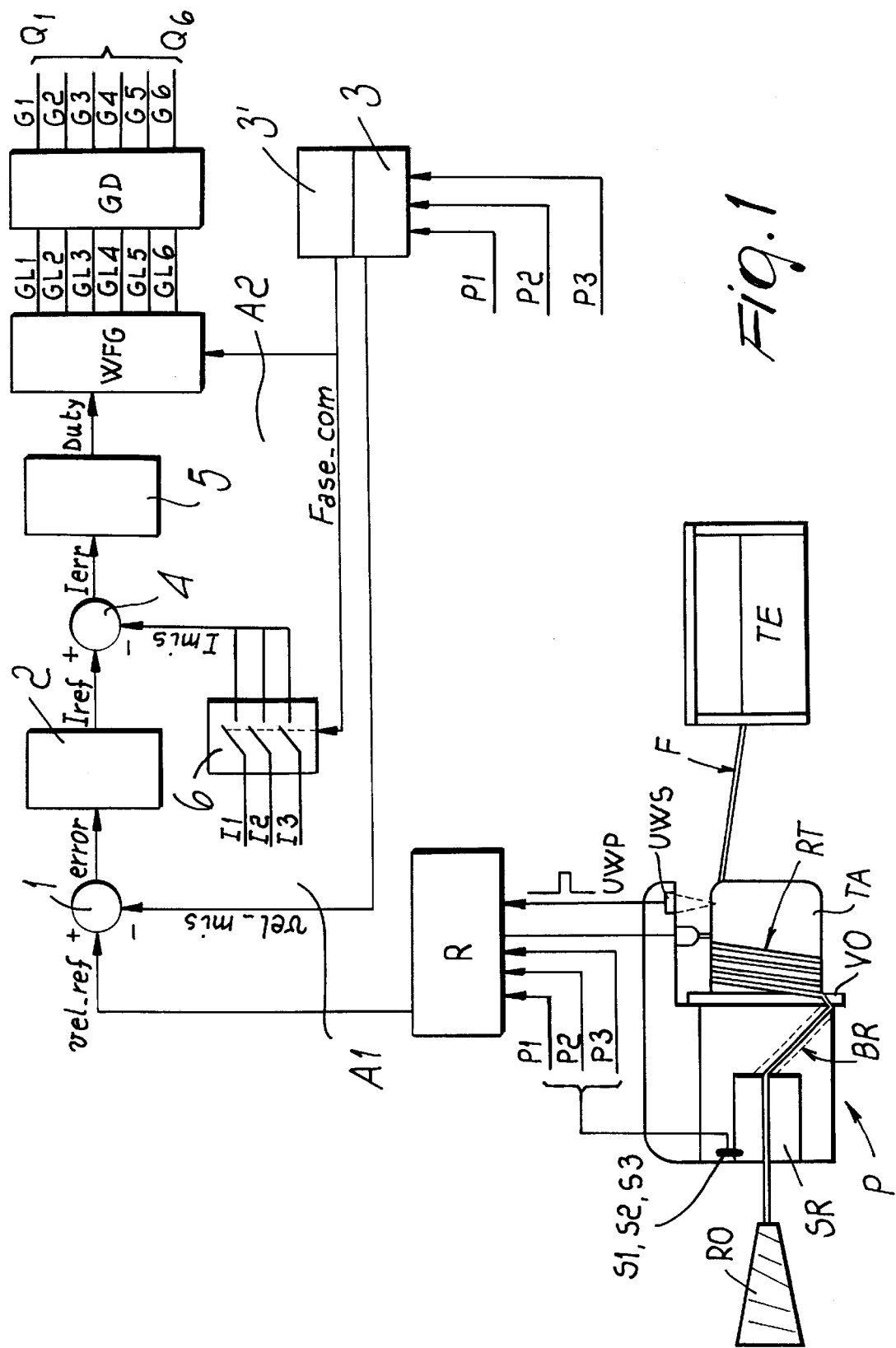
FIG. 1 is a block diagram of the device for moving the weft winding arm of a weft feeder with the control method according to a first embodiment of the invention.

FIG. 1 illustrates a weft feeder P comprising a weft winding arm BR which, by rotating about the fixed drum TA of the feeder P, winds onto the drum a plurality of turns of yarn F which constitute a weft reserve RT.

The yarn F, which unwinds from a spool RO, passes through the cavity of the shaft of a motor which moves the arm BR, which is hollow as well, so that it is wound onto the drum TA, from which it unwinds, when requested by the loom TE, at each weft insertion.

According to the present invention, the motor for moving the arm BR is of the type commonly known as switched reluctance, designated by the reference sign SR, and is controlled by a pair of closed-loop systems which are generally designated by A1–A2 and are meant to ensure the correct operation of the weft winding arm both in terms of rotation rate and of acceleration or deceleration, in order to ensure the correct replenishment of the turns of the weft reserve RT as such turns unwind from the drum TA.

For this purpose, the first loop A1 for controlling the rotation rate of the motor SR comprises a logic block R which receives pulsed signals P1-P2-P3 produced by sensors for detecting the angular position of the rotor of the motor SR, designated by S1-S2-S3, described hereinafter, and the pulsed signal produced by a sensor UWS, typically of the photocell type, which generates a signal peak UWP upon the passage of each turn that unwinds from the drum TA. The block R, by processing signals P1-P2-P3 and UWP, extracts a signal, or more properly a datum, vel-ref which corresponds to the exact rate at which the arm BR must rotate in order to operate correctly.

The datum vel-ref is the reference variable of the adjustment loop A1, whose measured variable, termed vel-mis, is the actual winding rate deduced by a logic block 3 which processes, for example, the time interval between two consecutive sets of three signals P1-P2-P3. In another logic block 1, the datum vel-mis is subtracted from the datum vel-ref in order to obtain an error datum "error" which is sent to a known PID regulator, designated by the reference numeral 2, which provides a datum Iref in terms of current which represents the torque/current reference of the second current adjustment loop A2.

The second loop, preset to control the current in the switched active phase of the motor SR, includes a block 3' associated with the block 3 and which also processes the pulsed signals P1-P2-P3 in order to provide a datum Fasecom which indicates, on the basis of the variations of the phase inductances L1-L2-L3 dependent on the mechanical angle a of the rotor, as more clearly described hereinafter, which of the three (or more) phases of the motor SR is to be energized at the instant being considered. The datum Fasecom is sent to a multiplexer 6 which, depending on said datum, chooses among the currents measured on the three (or more) phases which one to use to define the measured variable Imis of the second loop A2 for controlling the current that circulates in the switched phase of the motor.

Figure 1A:
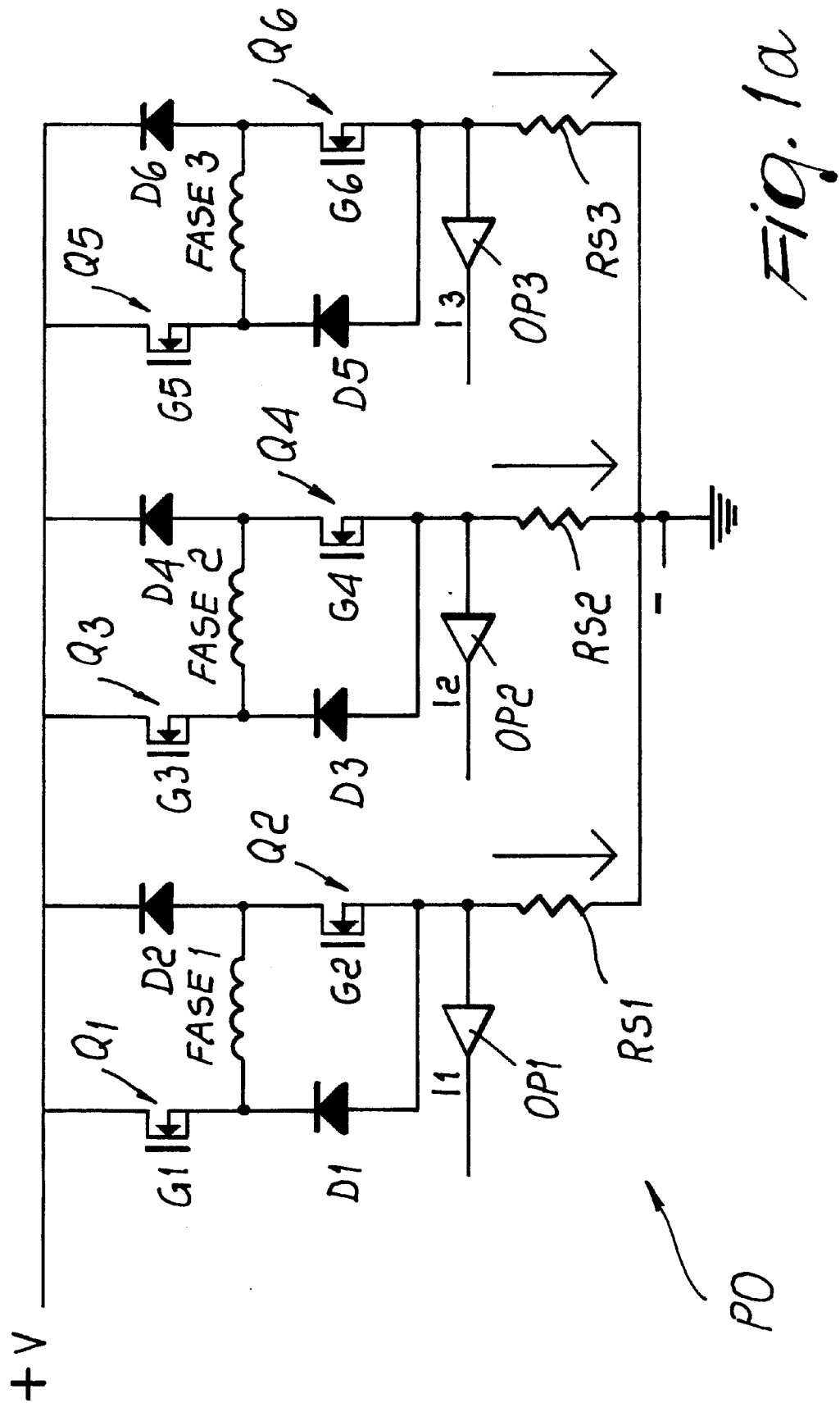
FIG. 1a is a block diagram of the power section (inverter) for supplying power to the switched-reluctance motor for moving the weft winding arm of the feeder of FIG. 1.

The currents I1-I2-I3 circulating in the phases of the motor RS are obtained by amplifying, by means of respective amplifiers OP1, OP2, OP3 (FIG. 1a), the voltage drop across corresponding shunt resistors RS1-RS2-RS3 which are interposed between the ground (negative) and the respective power transistor Q2-Q4-Q6 of the inverter bridge PO.

The difference Iref-Imis provides the error datum Ierr, which is applied to the input of a second PID regulator, designated by the reference numeral 5, for compensating the error Ierr.

The PID 5 provides in output a numeric datum DUTY which can vary from 0 to 100 and represents the percentage of voltage, relative to the DC voltage V that supplies the inverter bridge PO, to be applied to the switched phase of the motor SR. A block WFG modulates the voltage signal on the phase to be energized at the instant being considered, providing corresponding pulse width modulation (PWM) pulses on its outputs GL1 . . . GL6, while a subsequent gate driver block GD shifts the level of said pulses PWM to values which are present on its outputs G1–G6 and are adapted to drive the power transistors (MOSFETs) Q1–Q6 of the inverter bridge PO.

Figure 3:
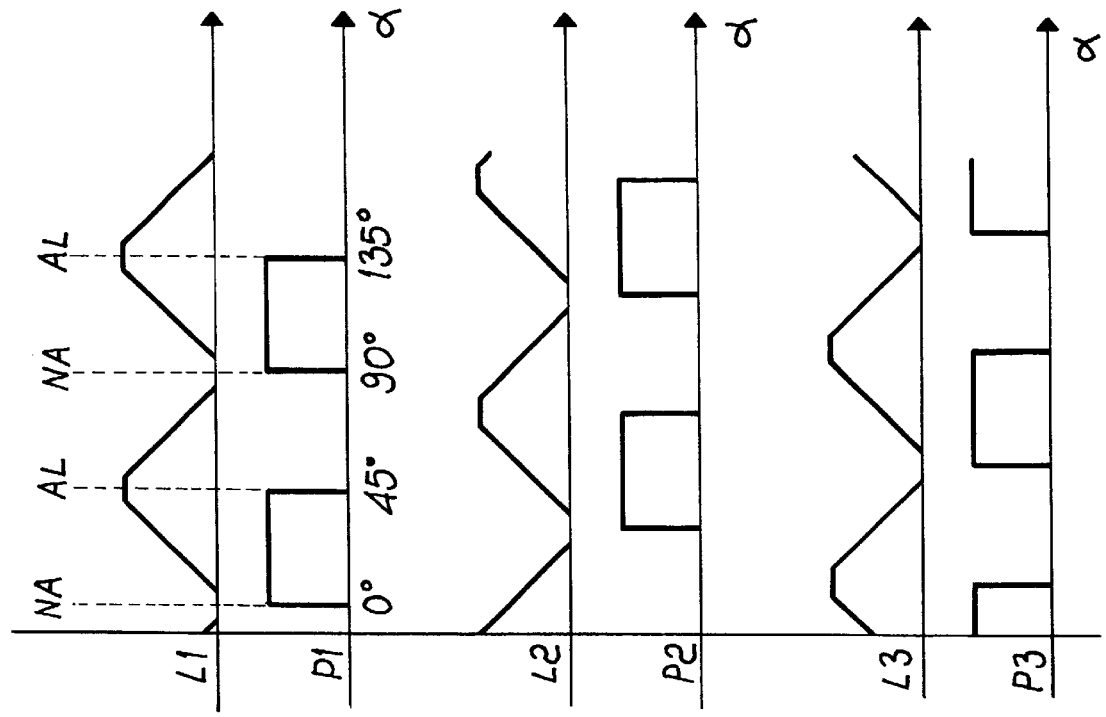
FIG. 3 is a chart which plots the progress of the inductance of the phases of the switched-reluctance motor in relation to the signals of the set of three decoding sensors.
Figure 2:
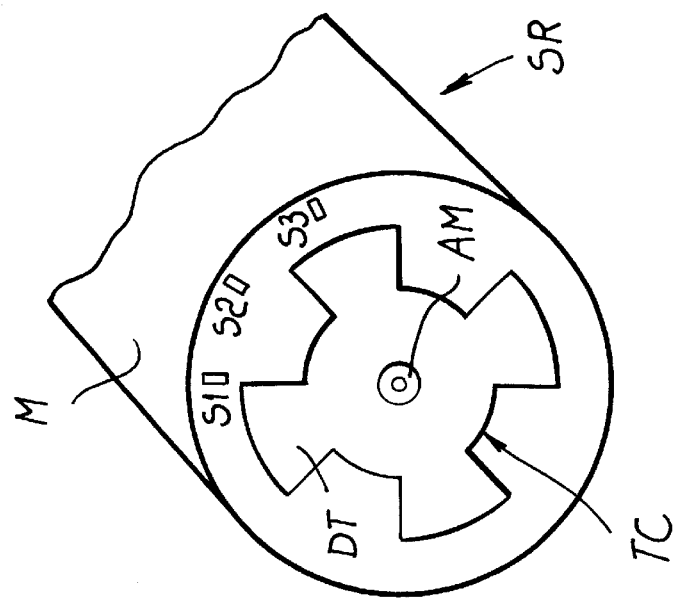
FIG. 2 is a keying diagram of a set of three sensors for decoding the angular position of the rotor of the switched-reluctance motor of the weft winding arm of the feeder of FIG. 1.

The arrangement of the three sensors S1-S2-S3 for decoding the angular position of the rotor of the motor SR and the positioning of the respective signals P1-P2-P3 of said sensors with respect to the inductances L1-L2-L3 of the phases is now described, with reference to FIGS. 2 and 3, the motor being, by way of example, of the three-phase type.

The arrangement of the sensors depends on the number of stator poles and rotor poles of the motor SR, and is determined so as to achieve switching from one phase to the other when the rotor of the motor, as better explained hereinafter, is in the angular position corresponding to the beginning of the (positive or negative) variation of the inductance L of the phase to be switched; said inductance being variable (FIG. 3) according to the variation of the mutual position of the teeth of the stator poles and the teeth of the rotor poles.

FIG. 2 illustrates the relative angular arrangement of the three sensors S1-S2-S3 for decoding the rotor angle of a three-phase motor of the 6/4 type, i.e. a motor with six stator poles and four rotor poles.

For such a switched-reluctance motor, since four electrical periods are required in order to produce a complete rotation of the rotor, each sensor must provide a periodic signal with a period equal to 90 mechanical degrees of the rotor. For this purpose, the sensors are rigidly coupled to the outside of a disk DT (which lies outside the cylindrical portion M of the motor SR but is keyed on the shaft AM of the motor), which has four identical recessed notches TC, evenly spaced, and cover an angle of 45° each. Moreover, since the motor considered is of the three-phase type, the three signals P1-P2-P3 of the sensors S1-S2-S3 must have a mutual phase shift of ⅓ of an electric turn, i.e. 30 mechanical degrees, so that they are angularly spaced by 30° from each other.

FIG. 3 plots, as mentioned, the progress of the inductances L1-L2-L3 of the three phases and the positioning of the signals P1-P2-P3 in relation to such inductances according to the mechanical angle α of the rotor of the motor.

The chart related to the inductance L1 highlights the points AL of maximum alignment of the generic rotor pole with the stator pole of the first phase, which coincide with the maximum value of the inductance L1, and the points Na of maximum non-alignment of the poles, which coincide with the minimum value of the inductance of the phase.

If the motor SR is required to deliver a positive torque, e.g. in order to accelerate the weft winding arm BR, the switching of each phase, for example the phase I already considered, begins at the points NA and ends at the points AL, the torque being a function (mathematical derivative) of the positive variation of the phase inductance L1.

Vice versa, if the motor is required to provide a braking torque, e.g. in order to slow the arm BR, the switching of each phase begins in the points AL and ends in the points NA; the braking or negative torque being a function of the negative variation of the inductance L1.

The sensors S1-S2-S3 can be of any conventional type and are typically constituted by photocells or magnetic Hall sensors cooperating with a strip of permanent magnet (not shown) which is arranged outside the cylindrical portion M of the motor SR.

Figure 4:
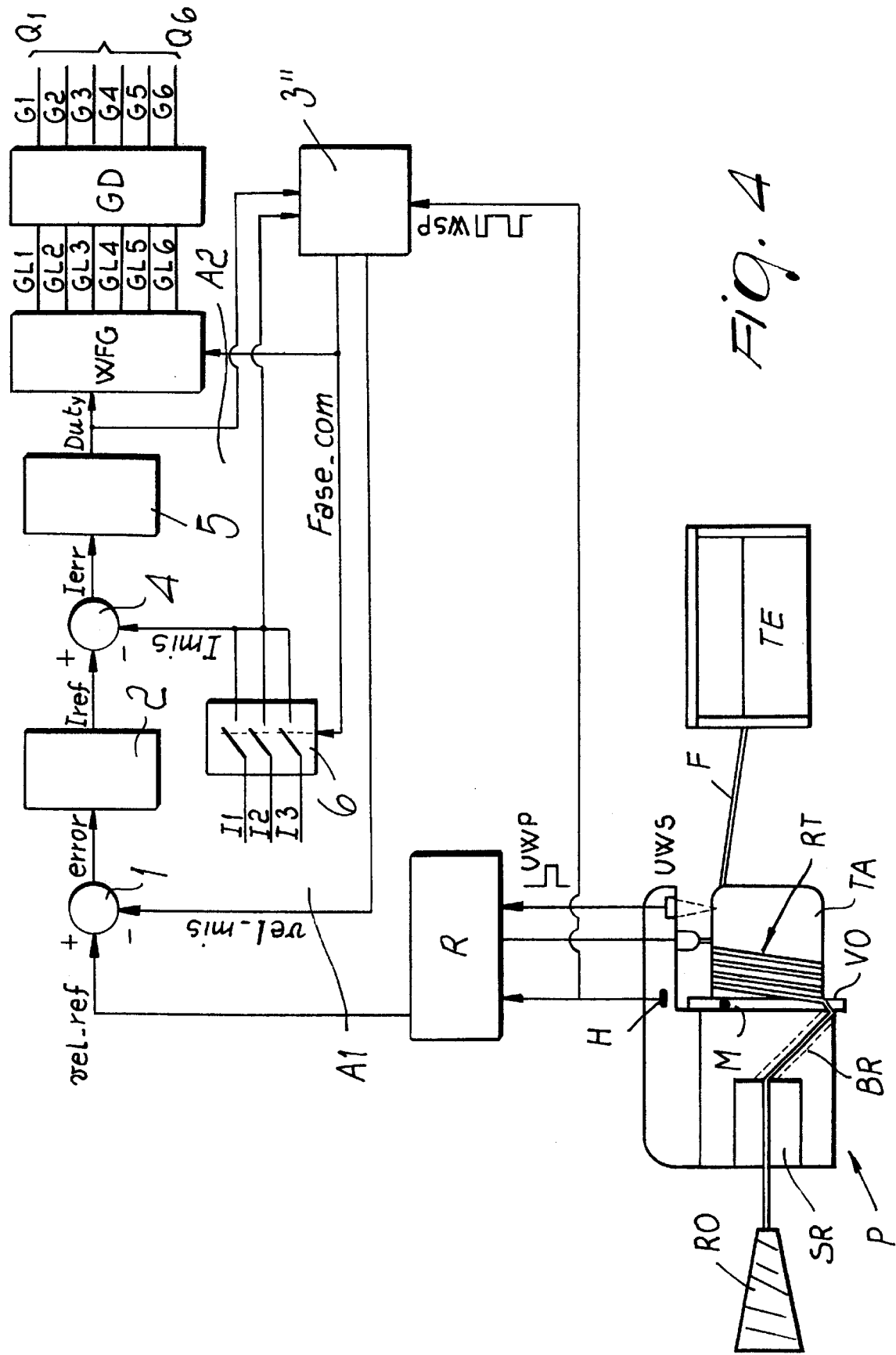
FIG. 4 is a block diagram, similar to FIG. 1, of the device according to a second embodiment of the invention.

The embodiment of FIG. 4, in which similar or corresponding parts have been designated by the same reference signs, differs from what has been described above first of all in that the sensors S1-S2-S3 for decoding the angular position of the rotor are suppressed and in that such sensors are replaced, for the purpose that will become apparent hereinafter, by a single Hall sensor H, which is already conventionally present in the feeder P for processing a datum which is proportional to the rotation rate of the arm BR;

such datum being constituted by a pulsed signal WSP emitted by the sensor at each passage in front of it of a permanent magnet M which is supported by a flywheel VO rigidly rotationally coupled to the arm BR and located at the base of the drum TA of the feeder P. Moreover, in the embodiment of FIG. 4, the block 3' of the second adjustment loop A2 is replaced with a logic block 3" which calculates the flux $\Phi_t$ that is concatenated with the currently switched phase, taking:

$$\Phi_t = \int (v-IR)dt + \Phi_0 \qquad 1)$$

where:

$\Phi_t$ = magnetic flux at the instant t being considered;

$\Phi_0$ = magnetic flux at the instant in which switching begins (equal to zero, since at such instant I phase=0);

v = voltage present across the switched phase; where v=Duty.Vbus, where Duty is the percentage variable that is present at the output of the block 5 and Vbus is the voltage of the bus that supplies the bridge inverter PO;

I = current circulating in the switched phase, i.e. Imis;

R = phase resistance of the motor SR.

Figure 5:
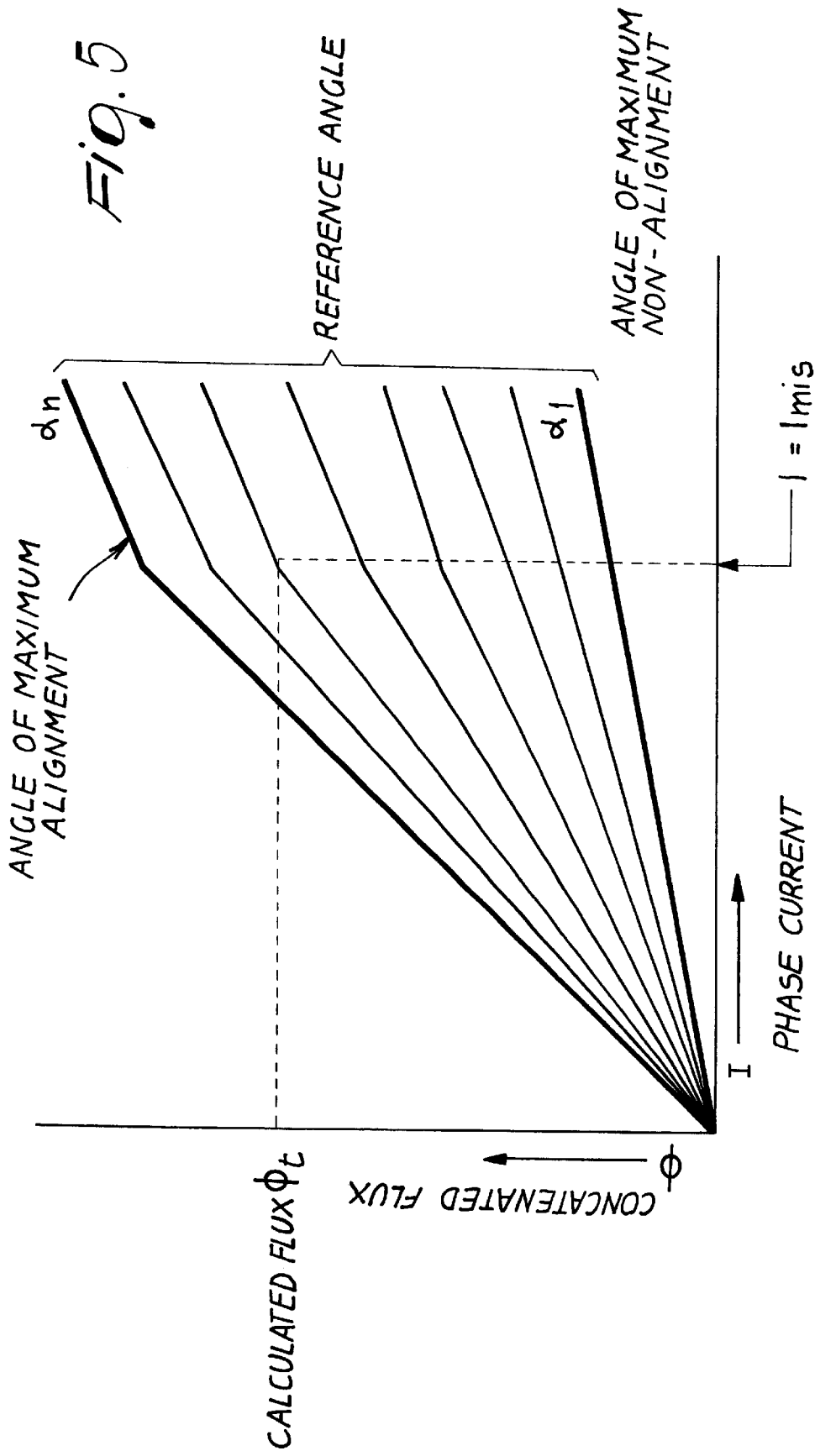
FIG. 5 is a chart which plots a family of curves which correlate the mechanical angle a of the rotor of the motor of the feeder of FIG. 4 with the flux concatenated with the switched phase of the motor and with the current of the phase.

The value $\Phi t$ thus calculated and the current I that circulates in the motor are then correlated (via software) with a function known in advance and precalculated, of the kind $\alpha = f((\Phi,I))$, represented by the family of curves $\alpha 1 \ldots \alpha n$ of the chart of FIG. 5. This function, by allowing to know the angle $\alpha$ of the rotor for a given value of the calculated flux $\Phi_t$ and of the measured current I, allows to choose autonomously, i.e. independently of angular decoding signals of the rotor, the instant of switching from one phase to the other.

A drawback of this switching method, which however is advantageous thanks to the simplifications that it allows to introduce in the adjustment system of the loop A2, is the high uncertainty of the value $\Phi_t$ calculated with (1). This is essentially due to the variability of the phase resistance R which, due to the thermal variations produced as the electrical load on the stator varies, can assume incorrect values which differ by 50–60% with respect to the nominal value. The phase voltage v also is easily subject to measurement errors and moreover is fully independent of the percentage of voltage across the power elements Q1–Q2 of the inverter bridge PO.

In order to eliminate this drawback, the signal WSP is used to compensate both the errors in measurement of the phase voltage and the altered values assumed by the phase resistance R due to thermal drift.

This is achieved, according to the invention, by placing the magnet M of the flywheel VO, with respect to the sensor H, so that the signal WSP generated by such sensor corresponds to a given and correct rotor angle $\beta$, so that the block 3", in the instant in which it acquires the front of said signal WSP (e.g. the positive front), automatically corrects via software both the angle $\alpha$, setting it equal to $\beta$, and the flux $\Phi$, setting:

$$\Phi_t = f(\beta, I).$$

Moreover, the information related to the error between the calculated angle $\alpha$ a and the real and known angle $\beta$ is also used to automatically correct, via software, the value of the phase resistance R, increasing it or decreasing it depending on whether $\alpha > < \beta$ respectively, i.e. by setting $$R_N = R_{n-1} - K(\beta - \alpha) \text{ if } \alpha < \beta$$

$$R_N = R_{n-1} - K(\alpha - \beta) \text{ if } \alpha > \beta$$

where K is a correction coefficient chosen according to the percentage value of the error.

Without altering the principle of the invention, the details of execution and the embodiments of the device and of the method may of course be altered extensively with respect to what has been described and illustrated by way of non-limitative example, without thereby abandoning the scope of the invention.

The disclosures in Italian Patent Application No. TO99A000928 from which this application claims priority are incorporated herein by reference.

What is claimed is:

1. A device for moving and controlling a weft winding arm in weft feeders for weaving looms, comprising, for the movement of said arm, a switched-reluctance motor, and in that said motor is controlled by a first adjustment closed loop for speed control, which has its own reference variable and its own measured variable, and by a second adjustment closed loop for controlling the current that circulates in the phase of the motor, which also has its own reference variable and its own measured variable.

2. The device according to claim 1, wherein said first adjustment closed-loop adjustment system is provided with a logic block which processes pulsed signals of a first sensor or group of sensors for detecting the speed of the arm and of a second sensor or group of sensors for detacting the passage of the weft turns that unwind from the feeder, in order to extract a datum which represents the reference variable of said first adjustment loop: said reference variable of the first loop corresponding to the rotation rate that the winding arm must assume in order to correctly store turns of a weft reserve on the feeder.

3. The device according to claim 1, wherein said first adjustment loop also comprises a logic block which is meant to subtract from the datum that constitutes the reference variable of said first adjustment loop the datum that constitutes the measured variable in said adjustment loop, in order to obtain an error datum which is processed by a first regulator of the PID type which generates, on its output, a datum, in terms of current, representing the torque/current reference variable for the second adjustment loop.

4. The device according to claim 2, wherein said second loop for controlling the current in the active and switched phase of the motor comprises a logic block which is adapted to process the pulsed signals emitted by said group of sensors in order to provide a phase datum which indicates, depending on variations of phase inductances according to a mechanical angle of the rotor of said motor, which of the phases of the motor is to be excited in the instant being considered.

5. The device according to claim 4, wherein said second adjustment loop also comprises a multiplexer which, on the basis of said phase datum emitted by said logic block which processes the signals of said group of sensors, chooses, among the measured currents, the one to be used in order to define said measured variable of the second control loop.

6. The device according to claim 1, wherein said second loop comprises a logic subtractor block which is meant to subtract from the datum that constitutes the reference variable of said second adjustment loop said measured variable of the second loop in order to obtain an error datum which is processed by a second PID regulator which generates, on its output, a numeric datum which can vary from 0 (zero) to 100 and represents the percentage voltage to be applied to the switched phase of the motor referred to a DC voltage that excites an inverter bridge that supplies said motor.

7. The device according to claim 6, wherein said percentage voltage, pulse-modulated and amplified, is adapted to drive the power transistors of said inverter bridge.

8. The device according to claim 2, wherein said group of sensors is supported by a disk which is rigidly coupled to a shaft of the motor; and wherein said disk is provided with recessed notches which are uniformly spaced and are equal in number to teeth of the poles of the rotor of said motor, and wherein said sensors are mutually offset by an angle equal to $1/n$ electrical turn, where n is the number of stator phases.

9. The device according to claim 2, wherein said second adjustment loop comprises a logic block which is adapted to calculate the value of the flux $\Phi t$ that is concatenated with the active and switched phase as a function of the voltage of a resistance and of a current I of the phase, said current constituting said measured variable of the second loop; and wherein the values of the flux $\Phi t$ and current I are correlated with a precalculated function of the type $\alpha = f(\Phi, I)$ which allows to know, for a given value of the phase current I and of the calculated flux $\Phi t$, a mechanical angle $\alpha$ of the rotor and to independently choose the instant of switching from one phase to the other.

10. The device according to claim 9, wherein said logic block that calculates the flux (Dt that is concatenated with the active phase receives a correction signal emitted by a sensor which is excited by a magnet rotating rigidly with the weft winding arm; and wherein said correction signal is used to compensate, for the purpose of a better evaluation of the concatenated flux $\Phi t$, both the errors in measurement of the phase voltage and the variations caused by thermal drift in the value of the phase resistance.

11. A method for controlling the rotation of a weft winding arm in weft feeders for weaving looms, comprising the steps of: turning said arm by means of a switched-reluctance motor; controlling a rotation rate of the arm with a first closed control loop by means of signals of sensors associated with a shaft of said motor; and controlling a torque delivered by said motor by controlling, by means of a second closed control loop, a current that circulates in a switched active phase in order to determine, by means of the signals of said sensors, the instant of switching from one phase to the other.

12. The control method according to claim 11, wherein the torque delivered by the motor is controlled by calculating, as a function of a voltage v of the current I and of a resistance R of the phase, a flux t that is concatenated with the switched active phase; where $$t = \int (v - IR) dt$$

and by correlating said concatenated flux t with a precalculated function of the type =f( ,I) adapted to determine the mechanical angle of the rotor of the motor and to autonomously choose the instant of switching from one phase to the other.

* * * * *